United States Patent [19]

Heyser

[11] 4,407,519
[45] Oct. 4, 1983

[54] BOAT TRAILER TONGUE EXTENDER

[76] Inventor: Gregory L. Heyser, 2881 Forebay Rd., Pollock Pines, Calif. 95726

[21] Appl. No.: 308,268

[22] Filed: Oct. 5, 1981

[51] Int. Cl.³ .............................................. B60D 1/14
[52] U.S. Cl. ................................. 280/482; 280/414.1; 280/491 R
[58] Field of Search ................. 280/414.1, 482, 491 R

[56] References Cited

U.S. PATENT DOCUMENTS 3,155,399  11/1964  Fetzko ................................. 280/482
3,385,610  5/1968   Vezina ................................. 280/482

Primary Examiner—Joseph F. Peters, Jr.
Assistant Examiner—Donn McGiehan
Attorney, Agent, or Firm—Laurance E. Banghart

[57] ABSTRACT

A trailer tongue extender that is attached to the tongue of a boat trailer as a first step in launching the boat, allowing the vehicle that is backing the trailer into the water to keep back from the uncertain ground near the water's edge. The extender latches into a receptacle that is permanently installed on the trailer tongue allowing the attachment or removal of the extender in three steps without the use of tools, bolts, or pins.

4 Claims, 5 Drawing Figures

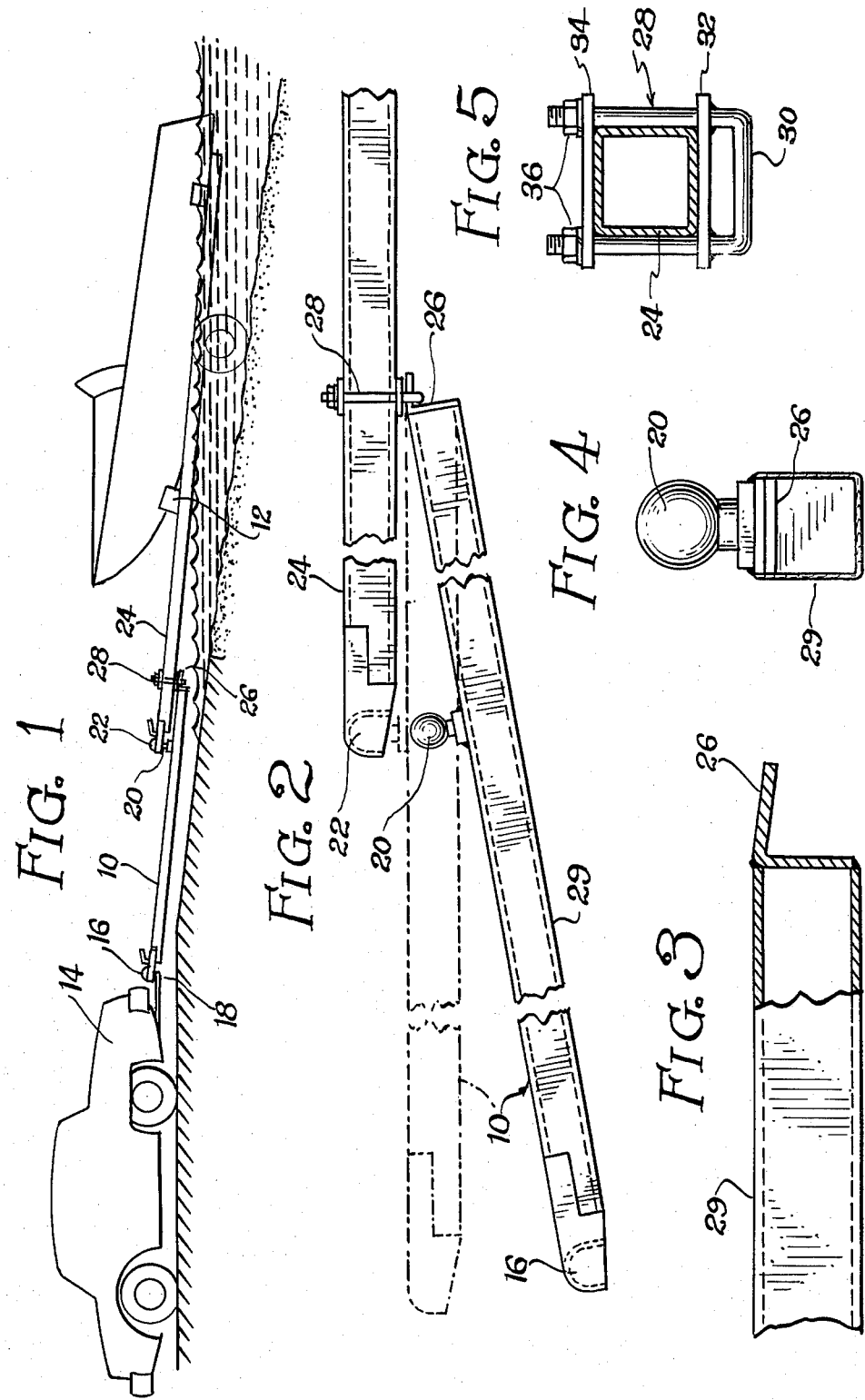

BOAT TRAILER TONGUE EXTENDER

BACKGROUND OF THE INVENTION

This invention relates to tongue extenders for boat trailers. A tongue extender is attached to the tongue of a boat trailer as a first step in launching the boat. This allows the vehicle that is backing the trailer into the water to keep back from the uncertain ground near the water's edge.

Tongue extenders are distinguished from extendible trailer tongues in that the latter are a permanent part of the trailer and bear the burden of highway safety requirements and regulations. U.S. Pat. No. 3,169,782 shows a typical extendible trailer tongue.

Tongue extenders are distinguished from tow bars in that the latter pivot at both ends, while the tongue extender is a rigid extension of the trailer tongue rotatably connected only at the end attached to the towing vehicle. U.S. Pat. No. 2,497,234 shows a typical tow bar. The superiority of tongue extenders comes in the improved control of trailer direction when backing the trailer.

U.S. Pat. No. 3,428,336 shows the art in tongue extenders. There are many moving parts with attendant high cost, low reliablity, and complex handling. Many of these moving parts are associated with the variable length of the extender. This variable length feature is not worth the disadvantages. An extender length of 2.6 meters is effective for the purpose and, at that length, can be easily carried on the boat trailer.

A most important characteristic of a tongue extender is its ease of installation. The prior art requires the fastening of a plurality of bolts and a pin each time the extender is attached, with the same effort required each time it is removed. Tools are required, the bolts may be rusty, and the pins may be lost.

SUMMARY OF THE INVENTION

A principal object of this invention is to provide a tongue extender that can be attached and removed without the use of tools, bolts, or pins. In order to accomplish this, a U-bolt receptacle is bolted to the trailer tongue and remains attached when the tongue extender is attached and removed.

Another principal object of this invention is to provide a tongue extender of minimum cost and highest reliability. The extender is preferably a one-piece weldment consisting of: a steel tube, a conventional trailer ball, a conventional trailer coupler, and a latch tab. The U-bolt receptacle consists of a U-bolt, two bolt-encircling plates, one of which is welded to the U-bolt, and two nuts.

After the one-time installation of the U-bolt receptacle on the trailer tongue, the tongue extender is attached in just three steps by: hooking the latch tab into the U-bolt receptacle; inserting the trailer ball of the tongue extender into the trailer coupler of the trailer tongue; and tightening the trailer coupler. Removal of the tongue extender follows the same steps in reverse order.

BRIEF DESCRIPTION OF THE DRAWINGS

The invention will be better understood by reference to the following figures in which:

FIG. 1 shows a tongue extender of this invention in place between boat trailer and towing vehicle as the boat is being launched;

FIG. 2 is a side elevation view of the tongue extender and a trailer tongue, with latch tab hooked into U-bolt receptacle, the dashed lines showing the fully installed position;

FIG. 3 is a side elevation view, partly in section, of the latch tab and metallic tube;

FIG. 4 is an elevation view of the extender from its latch tab end; and

FIG. 5 is a front elevation view of the U-bolt receptacle with the trailer tongue shown in section.

DETAILED DESCRIPTION

Referring now to FIG. 1, a tongue extender 10 of this invention is shown in place between a boat trailer 12 and a towing vehicle 14. At one end of the extender is a conventional trailer coupler 16 that is engaged with a trailer ball 18 attached to the towing vehicle. Said trailer ball is of the type attached to vehicles for towing any of a variety of trailers. Trailer ball 20, part of the extender, is shown engaged with trailer coupler 22 conventionally at the end of a trailer tongue 24.

A latch tab 26, part of the extender, is shown hooked into a U-bolt receptacle 28 that is attached to the trailer tongue 24. The attachment of the U-bolt receptacle to the trailer tongue is intended as a one-time operation, the receptacle remaining in place through many attachments and removals of the extender.

FIG. 2 shows the tongue extender 10 and the trailer tongue 24. The extender, in solid line, is shown partially installed to the trailer tongue with the latch tab 26 hooked into the U-bolt receptacle 28. The extender, in dashed line, is shown fully installed to the trailer tongue. The combination of U-bolt receptacle 28, latch tab 26, and trailer ball and coupler, 20 and 22, holds the extender in line with the trailer tongue as a rigid extension of the trailer tongue.

FIG. 2 emphasizes the only three steps are required to attach the extender 10 to trailer tongue 24: the latch tab 26 is hooked into the U-bolt receptacle 28; the trailer ball 20 is inserted into the trailer coupler 22; and the trailer coupler 22 is tightened.

FIGS. 2, 3, and 4 show a preferred construction of the extender 10. The body of the extender is a metallic tube 29 of square cross section. The preferred material is conventional structural steel. The extender 10 is a one-piece weldment consisting of steel tube 29, a conventional trailer coupler 16 welded to one end of steel tube 29, a conventional trailer ball 20 welded to the steel tube 29 approximately 0.4 meters from the end of the tube opposite the trailer coupler 16, and a latch tab 26 welded to the end of the tube opposite the trailer coupler. The latch tab 26 is angled downward by approximately 10 degrees from the longitudinal line of the extender. FIG. 3 shows the angle clearly. This facilitates installation of the extender from below the longitudinal line of the trailer tongue.

FIG. 5 shows a preferred construction of the U-bolt receptacle 28. A mild steel rod 30 is conventionally heated and bent in U shape and threaded at each end. The rod has a diameter of approximately 1.25 centimeters. Rod-encircling plates, 32 and 34, are approximately 0.65 centimeters thick. Plate 32 is preferably welded to rod 30. Plate 34 is placed over and around rod 30 when the U-bolt receptacle 28 is installed on the trailer tongue 24. Nuts 36 are then tightened on the threaded ends of rod 30.

Although particular embodiments of the invention have been described and illustrated herein, it is recognized that modifications and variations may readily occur to those skilled in the art. The following claims defining the invention cover such modifications and equivalents.

What I claim is:

1. A method for attaching a trailer tongue extender to a trailer tongue consisting of:
   a. hooking a latch tab at one end of the extender into a receptacle attached on the trailer tongue;
   b. inserting a trailer ball, located on the extender between 0.2 meters and 0.7 meters from the latch tab, into the trailer coupler at the end of the trailer tongue; and
   c. tightening the trailer coupler.

2. A trailer tongue extender comprising:
   a. a metallic tube;
   b. a trailer coupler, permanently fixed to one end of the metallic tube, for attaching to the vehicle that tows the trailer;
   c. a trailer ball, permanently fixed to the metallic tube between 0.2 meters and 0.7 meters from the end of the tube opposite the trailer coupler, for attaching to the trailer;
   d. a latch tab, permanently fixed to the end of the metallic tube opposite the trailer coupler; and
   e. a receptacle, attached to the trailer tongue, for accepting the latch tab, the combination of receptacle, latch tab, and trailer ball holding the extender in line with the trailer tongue as a rigid extension of the trailer tongue, said receptacle being arranged to stay attached to the trailer tongue when the extender is attached and removed.

3. A trailer tongue extender comprising:
   a. a metallic tube;
   b. a trailer coupler, permanently fixed to one end of the metallic tube, for attaching to the vehicle that tows the trailer;
   c. a trailer ball, permanently fixed to the metallic tube between 0.2 meters and 0.7 meters from the end of the tube opposite the trailer coupler, for attaching to the trailer;
   d. a latch tab, permanently fixed to the end of the metallic tube opposite the trailer coupler, said latch tab being angled downward from the longitudinal line of said metallic tube to facilitate the installation of the extender from below the longitudinal line of the trailer tongue; and
   e. a receptacle, attached to the trailer tongue, for accepting the latch tab, the combination of receptacle, latch tab, and trailer ball holding the extender in line with the trailer tongue as a rigid extension of the trailer tongue, said receptacle being arranged to stay attached to the trailer tongue when the extender is attached and removed.

4. A trailer tongue extender according to claim 3 wherein said latch tab is angled downward by at least 5 degrees from the longitudinal line of said metallic tube.

* * * * *